United States Patent [19]

Hackert et al.

[11] 4,287,223
[45] Sep. 1, 1981

[54] COVERING A STEEL PIPE HAVING A WELDING SEAM WITH A THERMOPLASTIC COATING

[75] Inventors: Karl-Heinz Hackert; Helmut Blume, both of Muehlheim, Fed. Rep. of Germany

[73] Assignee: Mannesmann Aktiengesellschaft, Duesseldorf, Fed. Rep. of Germany

[21] Appl. No.: 94,231

[22] Filed: Nov. 14, 1979

[30] Foreign Application Priority Data

Nov. 14, 1978 [DE] Fed. Rep. of Germany ....... 2849814

[51] Int. Cl.³ ............................................. B05D 1/26
[52] U.S. Cl. ......................................... 427/9; 156/64; 156/244.13; 427/10; 427/286; 427/287; 427/316; 427/375
[58] Field of Search ..................... 427/9, 10, 286, 287, 427/316, 375; 156/64, 244.13

[56] References Cited

U.S. PATENT DOCUMENTS 3,814,646   6/1974   Meyer et al. .................... 427/286 X Primary Examiner—James R. Hoffman
Attorney, Agent, or Firm—Smyth, Pavitt, Siegemund & Martella

[57] ABSTRACT

A steel pipe with a thermoplastic cover has the coverage of a welding seam reinforced by hot air heating the cover along the plastic and extruding a strip of similar plastic thereon, followed by cold water spray cooling. The pipe is centered as to the position of the welding seam vis-à-vis the heating and extruding equipment during relative longitudinal movement.

6 Claims, 1 Drawing Figure

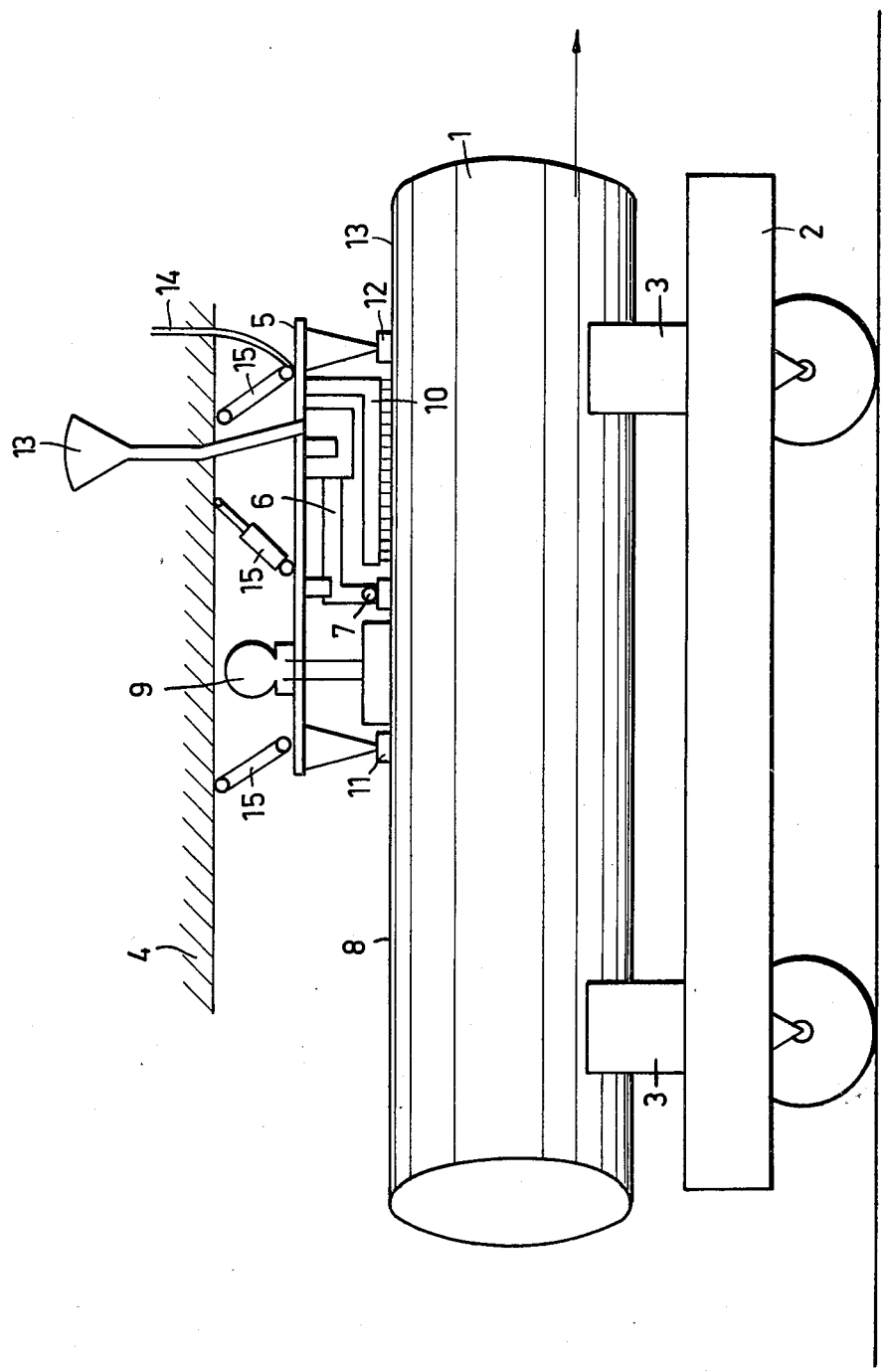

COVERING A STEEL PIPE HAVING A WELDING SEAM WITH A THERMOPLASTIC COATING

BACKGROUND OF THE INVENTION

The present invention relates to coating a steel pipe having a welding seam; but more particularly, the invention relates to coating such a pipe or tube by means of a thermoplastic such as polyethylene.

Coatings are applied to pipes or tubes, for example, by means of tapes, ribbons, or a hose, placed onto and around the tube which has been covered previously with an adhesive. Such a protective coating is needed, for example, when the pipes or tubes are installed underground.

A pipe or tube may be coated or covered, for example, by extruding the thermoplastic onto the pipe, or in some other fashion.

More specifically, German Pat. No. 17,71,764 describes a method in which a thermoplastic ribbon is helically wrapped around a rotating, heated steel pipe, together with an adhesive tape. Both ribbons are separately extruded, just prior to wrapping. A problem may arise here if the tube or pipe has a radially outwardly protruding bead of a welding seam. The ribbons may not fully adhere to the seam and/or the adjoining areas so that narrow, capillary-like gaps remain. Moreover, these gaps may form a long, continuous gap along the seam. Moisture may penetrate and migrate for the length of the pipe and corrode it. The problem arises, regardless whether the seam extends axially or helically. The problem exists also when the coating is applied as an in situ extruded hose.

Another problem arises in coating or covering the increase in wear of the cover above the protruding seam. It was found that, indeed, the cover is or will become thinner on the seam. This can be counteracted by extruding, or otherwise applying, the coating or cover to be thicker than actually necessary. Obviously, this is to some extent a waste of material because the major part of the surface of the pipe is now covered to an excessive degree.

The latter problem has been dealt with in U.S. Pat. No. 3,814,646, see also German Pat. No. 21,17,618 in that strip sections are placed on the seam (only) just prior to wrapping a regularly thick ribbon around the pipe. This patent describes a particular placement mechanism for such a strip, being actuated once for each full turn of the pipe, and the length of that strip is equal to the rate of axial progression of the pipe per revolution.

German Pat. No. 24,07,427 describes another method in which an extruded and stretched ribbon is helically wrapped around the (rotating and axially advancing) pipe. Whenever a section of the seam is about to be covered, the stretch force is diminished. Thus, the cover will be thicker on the seam than elsewhere. Moreover, the formation of gaps adjacent to the seam is prevented by the use of a pressure roller, acting on the freshly laid-on ribbon portion just behind the seam. This method is quite suitable, but there is a need for reenforcing the coverage of a welding seam which is not dependant upon the wrapping of ribbon for the principal cover. Also, there is a need to provide for such supplemental coverage in cases in which the main wrapping machine is not provided with means for changing the tension.

DESCRIPTION OF THE INVENTION

It is, therefore, an object of the present invention to provide a new method and equipment to provide a supplemental coverage of the seam in seam-welded, plastic-coated pipes which will not cause the formation of capillary gaps along the seam and positively reenforces the coverage of the seam.

It is a specific object of the present invention to cover or coat the surface of a seam-welded steel pipe, using a relatively thin layer for coverage of the major part of the pipe, but a thicker cover for the seam area so that adequate adequate corrosion protection is provided throughout without requiring excessive quantities of plastic.

In accordance with the preferred embodiment of the invention, such a seam-welded pipe is provided with a regular thermoplastic cover without specific regard of the seam. Thereafter, the plastic is heated in the seam area, and a strip of the same plastic is extruded onto the heated portion to fuse therewith and cover the seam in a supplemental fashion. The strip is spray-cooled subsequently, and heating is preferably carried out by means of a hot-air blower. The equipment may be combined with a follow-up (or at least centering) control to provide for the extrusion precisely along the axial or helical seam as either the equipment moves relative to the pipe or vice versa, or a combination of both.

The preferred embodiment of the invention, the objects and features of the invention, and further objects, features and advantages thereof will be better understood from the following description taken in connection with the accompanying drawings.

DESCRIPTION OF THE DRAWINGS

The FIGURE is a schematic representation of equipment in accordance with the preferred embodiment and best mode of practicing the invention.

It is assumed that a steel pipe 1 is already coated or covered with polyethylene and is held on a carriage 2 by means of devices 3 which can cause the pipe to rotate on its axis. Such a rotation is not exclusively needed for practicing the inventive method; the rotation feature may have been made use of during coating or covering the pipe with a plastic ribbon in regular fashion. Most importantly, however, the rotating devices 3 are used to place welding 8 into a particular, e.g., the 12-o'clock position.

A frame or overhanging support structure 4 is disposed to support a plate 5 above the pipe after it has arrived on the carriage. Plate 5 carries a small extruder 6, being affixed thereto and having a discharge nozzle or extruder head 7 which is oriented to direct extrusion flow towards the weld seam as positioned directly under the extruder.

A hot-air blower 9 is positioned in front of the extruder from the point of view of axial pipe movement on carriage 2. A spray device 10 for cooling water is provided behind extruder 6.

A welding-seam position sensor 11 is disposed right in front of the equipment as mounted on plate 5. The output of that sensor is used to activate the rotating device 3 to correct the position of the pipe. Thus, sensor 11 is the input of a centering and follow-up control for the pipe.

Plate 5 carries at its other end a device 12 for measuring the thickness of the layer on seam 8. One may use this equipment for controlling the extrusion rate of the extruder, or one may control the speed of the carriage at least to make sure that the strip thickness remains within particular limits. A hopper 13 receives granulated polyethylene, and cooling water is supplied to sprayer 10 by means of a hose or conduit 14.

The various pieces of equipment are mechanically biased in a down-direction to be in intimate contact with the pipe's surface as covered, and along the uppermost line of the pipe as positioned, in which line the seam is, or should be, located underneath the cover. The bias is obtained by means of hydraulic or pneumatic cylinders 15.

The device and apparatus as described operates as follows. It is assumed that pipe 1 has been covered with a layer of polyethylene by means of extrusion, wrapping of ribbon around the pipe, etc. The pipe arrives on carriage 2 under the equipment mounted on plate 5, and sensor or detector 11 determines the azimuthal disposition of the seam. If necessary, rollers 3 are activated to center the seam in a closed-loop operation.

Next, hot-air blower 9 softens the polyethylene layer underneath, particularly in the region around the welding seam. Immediately following this softening step, a strip of polyethylene is extruded by means of extruder 6 with head 7; the extruded polyethylene will readily fuse with the softened polyethylene of the original layer. Following the strip laying, cold spray water is applied by means of nozzle 10 in order to cool the soft plastic.

The newly deposited strip is monitored with regard to its thickness by means of instrument 12 to obtain a running supervision of the seam-covering process. In the meantime, device 11 keeps the seam centered under the equipment.

It can readily be seen that the relative longitudinal motion between the extruding and associated equipment on the one hand, and the pipe on the other hand can readily be obtained by moving plate 5 on a carriage along the stationary pipe.

It can also be seen that in the case of a helical seam, a rotational movement of the pipe can be obtained through the follow-up control which uses sensor 11 as an input.

It will be appreciated that the depositing of a strip of thermoplastic can be carried out for reasons other than covering or reenforcing a welding seam; but this novel approach is applicable in all cases in which a thick strip or elongated plastic bead is deemed desirable.

The invention is not limited to the embodiments described above, but all changes and modifications thereof not constituting departures from the spirit and scope of the invention are intended to be included.

We claim:

1. In a method of covering a steel pipe having a welding seam, with a layer of thermoplastic material, the improvement of heating the layer in the region of the welding seam; and
    of extruding a strip of the same thermoplastic material as said layer onto the layer in the heated region above the welding seam to reinforce coverage thereof.

2. A method as in claim 1 and including the step of cooling the extruded strip immediately after the extrusion by spraying a coolant onto the strip.

3. A method as in claim 1 or 2, wherein the heating step includes blowing hot air towards the layer in said region.

4. A method as in claim 1 and including the step of centering the pipe with respect to the relative position of the seam and of an extruder used for the extruding step.

5. A method as in claim 1 or 4 and including the step of longitudinally moving the pipe under equipment for the heating and extrusion steps.

6. A method as in claim 1, including the step of measuring the thickness of the extruded strip.

* * * * *